(12) United States Patent
Aoki et al.

(10) Patent No.: US 9,126,483 B2
(45) Date of Patent: Sep. 8, 2015

(54) VEHICULAR DISPLAY SYSTEM

(71) Applicant: HONDA MOTOR CO., LTD., Tokyo (JP)

(72) Inventors: Koji Aoki, Wako (JP); Yoshimitsu Ishida, Wako (JP); Masaru Nakayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/070,711

(22) Filed: Nov. 4, 2013

(65) Prior Publication Data

US 2014/0062688 A1      Mar. 6, 2014

(30) Foreign Application Priority Data

Nov. 8, 2012   (JP) ................................. 2012-245999

(51) Int. Cl.
| | | |
|---|---|---|
| *B60C 1/00* | (2006.01) | |
| *B60K 35/00* | (2006.01) | |
| *B60Q 1/54* | (2006.01) | |
| *B60R 1/12* | (2006.01) | |
| *B60K 37/02* | (2006.01) | |

(52) U.S. Cl.
CPC ................. *B60K 35/00* (2013.01); *B60K 37/02* (2013.01); *B60Q 1/54* (2013.01); *B60R 1/12* (2013.01)

(58) Field of Classification Search
CPC .......... B60K 35/00; B60K 37/02; B60Q 1/54; B60R 1/12
USPC ............ 340/441, 936, 425.5, 426.11, 426.18, 340/426.31, 461, 439, 438; 342/357.31; 715/771, 765
See application file for complete search history.

(56) References Cited

U.S. PATENT DOCUMENTS

| | | | | |
|---|---|---|---|---|
| 5,428,353 | A | * | 6/1995 | Bird .............................. 340/933 |
| 5,691,695 | A | * | 11/1997 | Lahiff ........................... 340/461 |
| 8,002,179 | B2 | * | 8/2011 | Feit et al. ...................... 235/382 |
| 2003/0006892 | A1 | * | 1/2003 | Church ......................... 340/439 |
| 2006/0286944 | A1 | * | 12/2006 | Songwe ......................... 455/99 |
| 2007/0176797 | A1 | | 8/2007 | Rhodes et al. |
| 2010/0138149 | A1 | * | 6/2010 | Ohta et al. .................... 701/201 |
| 2010/0323715 | A1 | * | 12/2010 | Winters ..................... 455/456.1 |

(Continued)

FOREIGN PATENT DOCUMENTS

| | | |
|---|---|---|
| JP | 2007-139901 | 6/2007 |
| JP | 2009-527409 | 7/2009 |

(Continued)

OTHER PUBLICATIONS

Japanese Office Action with partial English translation dated Aug. 19, 2014, 8 pages.
Japanese Decision of Refusal dated Apr. 7, 2015 with partial English translation, 6 pages.

*Primary Examiner* — Hoi Lau
(74) *Attorney, Agent, or Firm* — Rankin, Hill & Clark LLP (57) ABSTRACT

A vehicular display system includes a vehicle on-board unit having a vehicular display part, and a mobile device having a mobile display part. The vehicular display part is fixedly mounted on a vehicle and configured to display vehicular information including at least a vehicle speed. The mobile display part is configured to display the vehicular information including the vehicle speed when the mobile device is set in position between a driver of the vehicle and the vehicular display part.

5 Claims, 6 Drawing Sheets

(56) References Cited

U.S. PATENT DOCUMENTS

| | | | |
|---|---|---|---|
| 2011/0267184 A1* | 11/2011 | Lee | 340/435 |
| 2011/0304444 A1* | 12/2011 | Zhang et al. | 340/425.5 |
| 2012/0242462 A1* | 9/2012 | Nagara et al. | 340/407.1 |
| 2012/0242473 A1* | 9/2012 | Choi | 340/441 |
| 2012/0242474 A1* | 9/2012 | Oh et al. | 340/441 |
| 2013/0082874 A1* | 4/2013 | Zhang | 342/357.31 |
| 2013/0144463 A1* | 6/2013 | Ricci et al. | 701/1 |
| 2013/0207795 A1* | 8/2013 | Gau | 340/426.11 |
| 2013/0241720 A1* | 9/2013 | Ricci et al. | 340/425.5 |

FOREIGN PATENT DOCUMENTS

| | | |
|---|---|---|
| JP | 2010-522119 | 7/2010 |
| JP | 2011-037310 | 2/2011 |
| JP | 2011-89893 | 5/2011 |
| JP | 2011-111123 | 6/2011 |
| JP | 2012-65245 | 3/2012 |

* cited by examiner

VEHICULAR DISPLAY SYSTEM

TECHNICAL FIELD

The present invention relates to a vehicular display system for displaying information to a driver or vehicle occupant in a vehicle.

BACKGROUND ART

A vehicular display device constituting a vehicular display system is disclosed, for example, in Japanese Patent Application Laid-Open Publication (JP-A) No. 2011-111123, which displays a first image (containing information of a vehicle speed and warnings, for example) on an HUD (head-up display) and a second image (containing information of a speed meter and a tachometer, for example) on a meter by using a single light source unit such as a light-projector.

In the vehicular display device disclosed in JP 2011-111123 A, however, an ECU (electronic control unit) for controlling the light source unit must include a luminance value adjustment means which controls the luminance of the light source unit based on the higher illuminance of a cabin-outside illuminance and a cabin-inside illuminance detected respectively by an external illuminometer and an internal illuminometer, and a pixel value adjustment means which performs, based on the lower illuminance of the detected cabin-outside illuminance and the detected cabin-inside illuminance, control to reduce the pixel value of one of the first image and the second image to be lower than the pixel value of the other. In other words, the ECU must have a complex configuration, and the manufacturing cost of the vehicular display device is inevitably increased.

SUMMARY OF THE INVENTION

It is therefore an object of the present invention to provide a vehicular display system which can reduce the manufacturing cost.

According to the present invention, there is provided a vehicular display system comprising: a vehicle on-board unit having a vehicular display part; and a mobile device having a mobile display part, wherein the vehicular display part is fixedly mounted on a vehicle and configured to display vehicular information including at least a vehicle speed, and wherein the mobile display part is configured to display the vehicular information when the mobile device is set in position between a driver of the vehicle and the vehicular display part.

By using the mobile device (such as a tablet device) having the mobile display part, the manufacturing cost of the vehicular display system can be reduced. Further, with the mobile display part being controlled by the mobile device itself, the display part can be readily controlled. Since the mobile display part of the mobile device is configured to display the vehicular information including the vehicle speed, the mobile device can be set in position between the driver of the vehicle and the vehicular display part of the vehicle on-board unit. Namely, the driver can see the vehicular information including the vehicle speed on the mobile display part of the mobile device instead of the vehicular display part of the vehicle on-board unit (such as a meter unit). Note that the vehicular information including the vehicle speed is obtained by sensors within the vehicle such as a wheel speed sensor, not by sensors within the mobile device such as an acceleration sensor, and thus the driver can drive the vehicle safely.

Preferably, the mobile display part displays the vehicular information and mobile information concurrently, the mobile information being produced independently by the mobile device.

Since the mobile display part of the mobile device displays the vehicular information obtained from the vehicle and, concurrently, the mobile information produced independently by the mobile device, the driver can also see on the mobile display part the mobile information including navigation information and music information, for example.

Preferably, the mobile display part is disposed on an opposite side of a driver's seat of the vehicle with respect to a steering wheel of the vehicle, and, when the steering wheel and the mobile display part are viewed from the driver's seat, the vehicular information displayed on the mobile display part is located on one of an outer side of the steering wheel and an inner side of the steering wheel, and the mobile information is located on the other of the outer side of the steering wheel and the inner side of the steering wheel.

As viewed from the driver's seat, when the mobile display part of the mobile device is disposed behind the steering wheel, not in front of the steering wheel, the mobile display part is divided by the steering wheel. In other words, the vehicular information and the mobile information displayed on the mobile display part are located respectively on the one side and the other side with respect to the steering wheel, thereby allowing the driver to easily see and obtain both the vehicular information and the mobile information.

Preferably, the vehicular information displayed on the mobile display part is located on the outer side of the steering wheel, and the mobile information is located on the inner side of the steering wheel.

A region of the mobile display part on the inner side of the steering wheel is defined by a part of the steering wheel such as a rim, and it might be hard to see the information located on the inner side of the steering wheel because of the steering wheel in front of the mobile display part. Conversely, the information located on the outer side of the steering wheel is free from being blocked by the steering wheel. Therefore, the vehicular information including the vehicle speed is located on the outer side of the steering wheel, so that the driver can see more clearly the vehicular information.

Preferably, the vehicle on-board unit and the mobile device are connected wirelessly, and the mobile device receives the vehicular information from the vehicle on-board unit by wireless.

By wirelessly connecting the vehicle on-board unit and the mobile device, the mobile device can easily be set to receive the vehicular information from the vehicle on-board unit by wireless. If the vehicle on-board unit and the mobile device are connected by wire or cable, the driver has to manually connect the vehicle on-board unit and the mobile device to set the mobile device on the vehicle, which would be troublesome for the driver.

Preferably, the vehicle on-board unit sends the vehicular information to the mobile device by wireless, and the mobile device includes an application which enables the mobile device to receive the vehicular information by wireless and display the received vehicular information on the mobile display part.

The vehicular information is send from the vehicle on-board unit to the mobile device by wireless. The application on the mobile device can receive by wireless a display image (display signal) produced by the vehicle on-board unit from the vehicular information, or can produce a display image from the vehicular information received by wireless. The application on the mobile device can thus handle the vehicular information appropriately.

Preferably, the vehicular display part has a display screen operable by an operating part provided at a predetermined position in the vehicle, the mobile device receives by wireless from the vehicle on-board unit operation information of the operating part, and the mobile display part has a display screen operable by the received operation information.

Normally, the display screen of the vehicular display part is operated by means of the operating part provided at the predetermined position in the vehicle. When the mobile device is set in the position between the driver of the vehicle and the vehicular display part, the display screen of the mobile display part can be operated by the operating part. Thus, the operating part provided in the vehicle can be used to operate both the vehicular display screen and the mobile display screen. In other words, since the vehicle on-board unit and the mobile device are connected wirelessly, the display screen of the mobile display part can be operated by the operating part provided in the vehicle.

Preferably, the operating part and the vehicle on-board unit are connected via an automotive communication network, and the vehicle on-board unit receives the operation information via the automotive communication network and sends the received operation information to the mobile device by wireless.

Since the operating part and the vehicle on-board unit are connected via the automotive communication network, there is no need to provide the operating part on the vehicle on-board unit, and the operating part can be located at a position near the steering wheel, for example, as the predetermined position in the vehicle.

BRIEF DESCRIPTION OF THE DRAWINGS

A certain preferred embodiment of the present invention will be described in detail below, by way of example only, with reference to the accompanying drawings, in which.

DESCRIPTION OF THE PREFERRED EMBODIMENT

Figure 1:
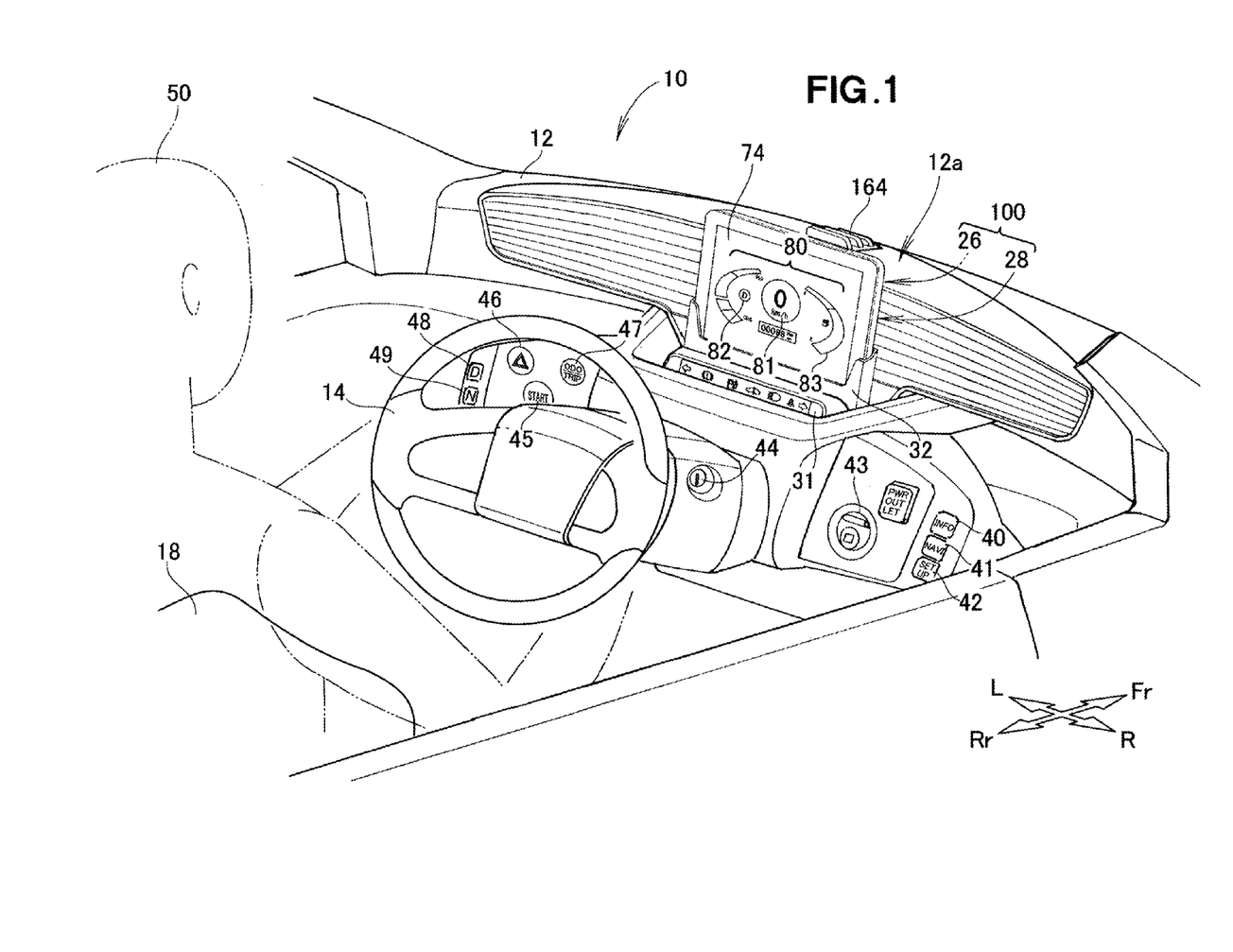
FIG. 1 is an interior view of a vehicle equipped with a vehicular display system according to the present invention.

As shown in FIG. 1, a vehicular display system 100 includes a vehicle on-board unit 26 and a mobile device 28. The mobile device 28 is set in position between a driver 50 of a vehicle 10 and a vehicular display part 26a (see FIG. 2) of the vehicle on-board unit 26. More specifically, the mobile device 28 is held by a holder 32, and the vehicular display part 26a of the vehicle on-board unit 26 is disposed behind the mobile device 28. The mobile device 28 is configured to display vehicular information 80 including at least a vehicle speed 81 obtained from the vehicle 10. In other words, with a mobile display part 74 of the mobile device 28 being configured to display the vehicular information 80 including the vehicle speed 81, the mobile device 28 can be set in the position between the driver 50 of the vehicle 10 and the vehicular display part 26a of the vehicle on-board unit 26, i.e. in front of the vehicular display part 26a.

The vehicular information 80 including the vehicle speed 81 is obtained by sensors within the vehicle 10 such as a wheel speed sensor (not shown), not by sensors within the mobile device 28 such as an acceleration sensor (not shown). Thus, the driver 50 can drive the vehicle 10 safely.

In the illustrated embodiment, the mobile device 28 having the mobile display part 74 is, for example, a tablet device. The tablet device is, generally, compact and thin. As the mobile device 28, the tablet device is easy to carry and easy to set on the vehicle 10. Also, the mobile device 28 may be a PDA (personal digital assistant) or a smart phone. Recently, these mobile devices are sold at low prices. By using the mobile device 28, the manufacturing cost of the vehicular display system 100 can be reduced.

Further, the mobile display part 74 of the mobile device 28 is controlled by the mobile device 28 itself, more specifically, on an OS (operating system) level of, for example, the tablet device. Thus, there is no need for such a special programming required in JP 2011-111123A, and therefore the mobile display part 74 can be readily controlled by simply controlling output on an application level.

In FIG. 1, reference characters Fr, Rr, R and L denote respectively "front", "rear", "right" and "left", which are used to refer to directions of the vehicle 10 with respect to the driver 50 or a driver's seat 18. The mobile display part 74 shown in FIG. 1 is disposed on an opposite side (i.e., located forwardly) of the driver's seat 18 with respect to a steering wheel 14 of the vehicle 10.

Figure 2:
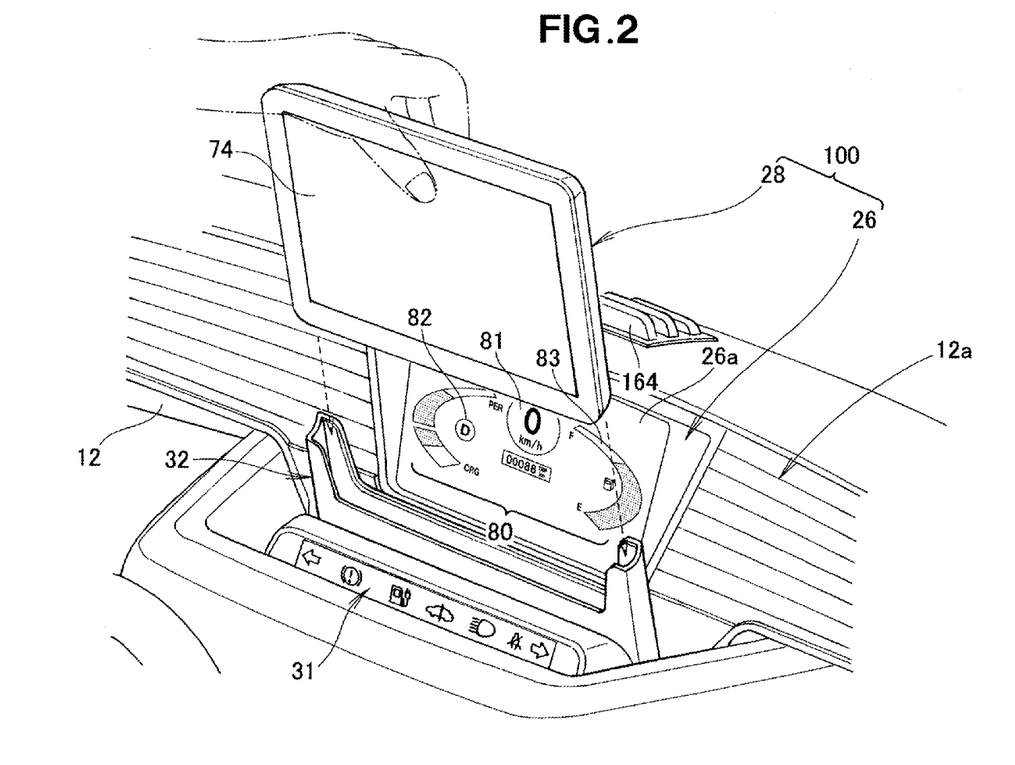
FIG. 2 is a view showing how a mobile device of the vehicular display system is set on the vehicle.

In FIG. 2, the driver 50 is setting the mobile device 28 onto the vehicle 10 by inserting a lower portion of the mobile device 28 into a recess of the holder 32.

The vehicle on-board unit 26 having the vehicular display part 26a is fixedly mounted on the vehicle 10 as shown in FIG. 2, and includes, for example, a meter unit. More specifically, the vehicle on-board unit (meter unit) 26 is embedded within a meter panel 12a, and the meter panel 12a is fixed to an instrumental panel 12 (see also FIG. 1). The meter panel 12a and the instrumental panel 12 together constitute a dashboard. Although the dashboard is thus formed by a combination of the meter panel 12a and the instrumental panel 12, the dashboard may be formed by a single member. In other words, the meter panel 12a may be omitted, and the vehicle on-board unit 26 having the vehicular display part 26a may be fixed to the instrumental panel 12 or the dashboard.

When the mobile device 28 is set in the position between the driver 50 (or driver's seat 18) and the vehicle on-board unit 26 (or vehicular display part 26a) as shown in FIG. 1, the mobile display part 74 of the mobile device 28 is configured to display the vehicular information 80 including the vehicle speed 81 which is displayed normally on the vehicular display part 26a.

The vehicle 10 includes a warning indicator 31, as shown in FIG. 2, which is configured to display warning lights such as a seatbelt warning light, a vehicle system warning light, a battery warning light, and a brake warning light. When the vehicle 10 does not have the warning indicator 31, the vehicular display part 26a may be configured to display these warning lights. The warning indicator 31 shown in FIG. 2 further includes lighting state indicator lights such as direction indicator lights and head lamps.

Figure 3A:
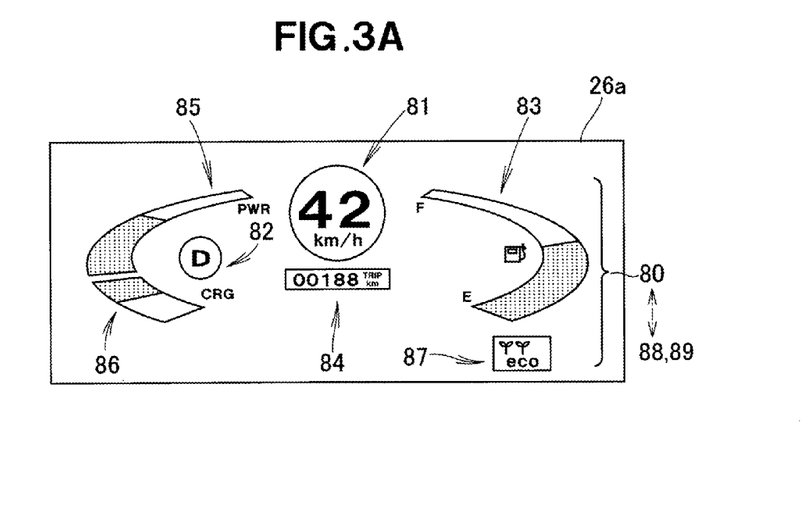
FIG. 3A is a plan view showing a display screen of a vehicle on-board unit of the vehicular display system.

FIG. 3A shows a display screen of the vehicle on-board unit 26, i.e. a display image displayed on the vehicular display part 26a of the vehicle on-board unit 26. As shown in this figure, the vehicular display part 26a of the vehicle on-board unit 26 is configured to display on the display screen the vehicular information including, as well as the vehicle speed (speed meter) 81, a shift position meter 82 (shown by "D", for example), a battery meter 83, an odometer/trip meter 84, a power meter 85, a regeneration meter 86, and an eco meter 87. In FIG. 1, the vehicle 10 includes an operating part ("ODO/TRIP" button) 47 provided at a position near the steering wheel 14 on the left side thereof. Every time the driver 50 presses the operating part 47, the odometer/trip meter 84 shown in FIG. 3A indicates the odometer and the trip meter alternately.

Although the vehicle 10 shown in FIG. 1 is an electric vehicle, the vehicle 10 may be a gasoline vehicle, and, in the gasoline vehicle, the display screen of the vehicular display part 26a shown in FIG. 3A may indicate a gasoline meter instead of the battery meter 83. Further, the vehicle 10 shown in FIG. 1 includes an operating part ("INFO" button) 40 provided at a position near the steering wheel 14 on the right side thereof. Every time the driver 50 presses the operating part 40, the display screen of the vehicular display part 26a shown in FIG. 3A may indicate, instead of the ordinary odometer/trip meter 84, an average fuel consumption meter, a distance to empty meter, and the odometer/trip meter 84 sequentially.

Figure 3B:
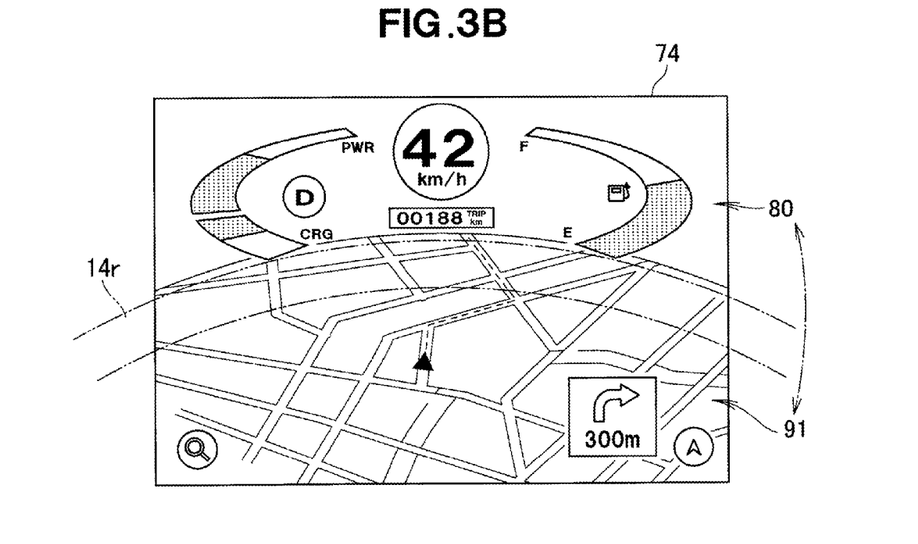
FIG. 3B is a plan view showing a display screen of the mobile device.

FIG. 3B shows a display screen of the mobile device 28, i.e. a display image displayed on the mobile display part 74 of the mobile device 28. As shown in this figure, the mobile display part 74 of the mobile device 28 is configured to display on the display screen the vehicular information 80 including at least the vehicle speed (speed meter) 81 displayed normally on the vehicular display part 26a, and the vehicular information 80 preferably also includes the other vehicular information 82 to 87. Namely, when the mobile display part 74 of the mobile device 28 is set in the position between the driver 50 and the vehicular display part 26a, it is preferred that the driver 50 should be able to obtain substantially all of the vehicular information 80 displayed normally on the vehicular display part 26a by looking the mobile display part 74 instead of the vehicular display part 26a.

When the mobile display part 74 has a smaller display size or resolution than the vehicular display part 26a, part of the vehicular information 80 to be displayed on the mobile display part 74 may be omitted. In other words, it is preferred that the mobile display part 74 should have a larger display size or resolution than the vehicular display part 26a so that the mobile display part 74 can also display mobile information 91 produced independently by the mobile device 28, concurrently with substantially all of the vehicular information 80 displayed normally on the vehicular display part 26a. By looking the mobile display part 74, the driver 50 can also obtain the mobile information 91 including, for example, navigation information. The vehicular information 80 including the vehicle speed 81 and the mobile information 91 including the navigation information are displayed and managed unitarily on the mobile display part 74 in this manner, thereby minimizing movement of the sight of the driver 50 and allowing the driver 50 to concentrate on driving the vehicle 10.

The mobile device 28 has a navigation application for navigating the vehicle 10 to a destination along a suitable traveling route, and the navigation application produces a display image containing the navigation information as the mobile information 91 (shown in a lower part of FIG. 3B).

The navigation application or an integrated application on the mobile device 28 can receive the display image containing the vehicular information 80 produced by the vehicle on-board unit 26, and produce an integrated display image displaying concurrently the vehicular information 80 and the mobile information 91, as shown in FIG. 3B. Alternatively, the navigation application or the integrated application on the mobile device 28 may receive the raw vehicular information 80 from the vehicle on-board unit 26, and produce a display image of the vehicular information 80 and a display image of the mobile information 91 to further produce an integrated display image displaying concurrently the vehicular information 80 and the mobile information 91.

As shown in FIG. 3B, the integrated display image displayed on the mobile display part 74 is composed of two image parts displayed respectively on upper and lower regions of the mobile display part 74. The upper image part of the integrated display image corresponds to the vehicular information 80, and the lower image part corresponds to the mobile information 91.

In FIG. 3B, an outline of a rim 14r of the steering wheel 14 is depicted by an imaginary line. When the steering wheel 14 and the mobile display part 74 are viewed from the driver's seat 18 (FIG. 1), the vehicular information 80 is located on an outer side of the steering wheel 14, and the mobile information 91 is located on an inner side of the steering wheel 14. A region of the mobile display part 74 on the inner side of the steering wheel 14 is defined by the rim 14r of the steering wheel 14, and it might be hard to see the mobile information 91 located on the inner side of the steering wheel 14 because of the steering wheel 14 in front of the mobile display part 74. Conversely, the vehicular information 80 located on the outer side of the steering wheel 14 is free from being blocked by the steering wheel 14. Therefore, the vehicular information 80 including the vehicle speed 81 is located on the outer side of the steering wheel 14, so that the driver 50 can see more clearly the vehicular information 80.

The integrated display image shown in FIG. 3B may be modified to have the upper image part corresponding to the mobile information 91 and the lower image part corresponding to the vehicular information 80. That is, the locations of the vehicular information 80 and the mobile information 91 are optionally determined with respect to the steering wheel 14, so that the driver 50 can easily see and obtain both the vehicular information 80 and the mobile information 91.

If the integrated display image displayed on the mobile display part 74 is composed of two image parts displayed respectively on left and right regions of the mobile display part 74, the driver 50 might be unable to see part of the vehicular information 80 and the mobile information 91 depending on the position in which the mobile device 28 is set.

When the mobile device 28 is set in the position between the driver 50 and the vehicular display part 26a as shown in FIG. 1, the driver 50 cannot see the vehicular display part 26a. The vehicular display part 26a can thus be turned off to thereby suppress the power consumption of a vehicle battery (not shown).

Figure 4A:
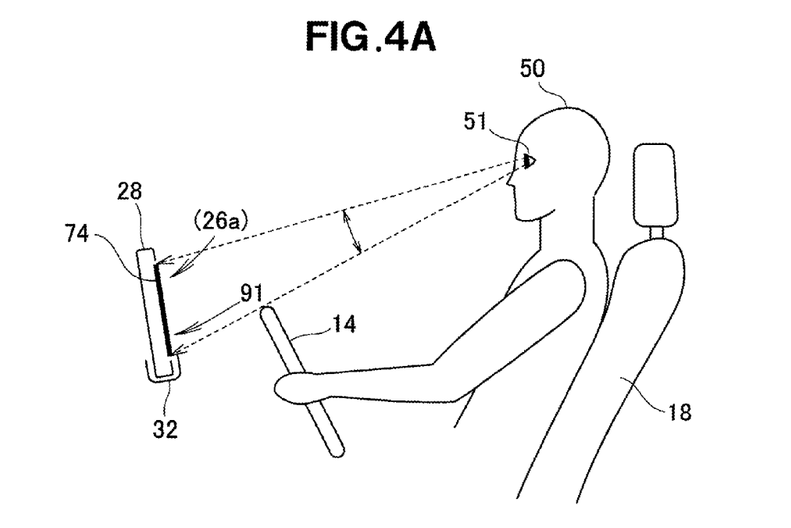
FIGS. 4A and 4B are side views showing positional relationships between the mobile device, a steering wheel of the vehicle, and a driver's point of view.
Figure 4B:
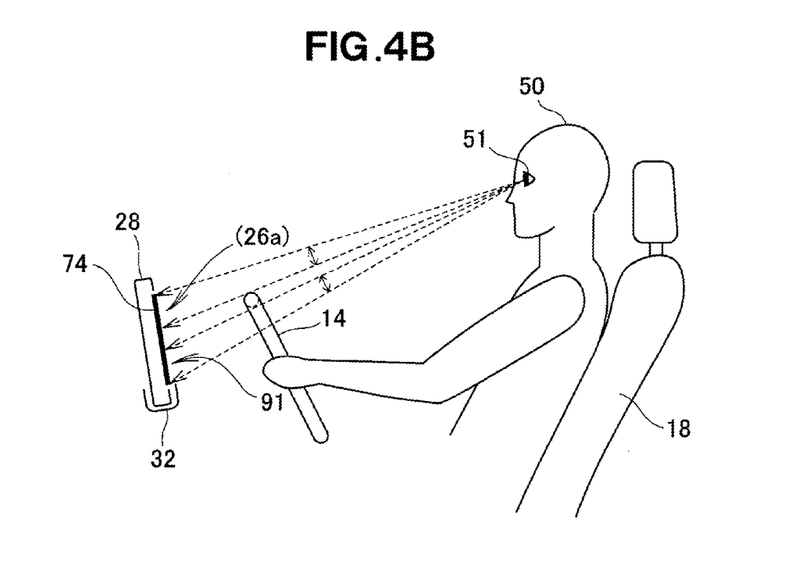

FIGS. 4A and 4B show the mobile device which is set in different positions. In FIG. 4A, when the vehicle 10 is viewed from the side, a line connecting an eye (point of view) 51 of the driver 50 and a lower edge of the mobile display part 74 coincides with a line passing through a top edge of the steering wheel 14 (rim 14r) and the lower edge of the mobile display part 74. Namely, the mobile device 28 is set in such a position that the steering wheel 14 does not get into a visual range of the driver 50 between an upper edge and the lower edge of the mobile display part 74. In this case, the maximum visual range of the driver 50 is ensured, and the entire integrated display image displayed on the mobile display part 74 can be seen by the driver 50.

In FIG. 4B, when the vehicle 10 is viewed from the side, a line connecting the eye (point of view) 51 of the driver 50 and the lower edge of the mobile display part 74 does not coincide with a line (not shown) passing through the top edge of the steering wheel 14 (rim 14r) and the lower edge of the mobile display part 74. Namely, the mobile device 28 is set in such a position that the steering wheel 14 gets into the visual range of the driver 50 between the upper edge and the lower edge of the mobile display part 74. In this case, the visual range of the driver 50 is narrowed, and part of the integrated display image displayed on the mobile display part 74 cannot be seen by the driver 50 (see FIG. 3B).

The integrated display image displayed on the mobile display part 74 of the mobile device 28 shown in FIGS. 4A and 4B has, for example, the upper image part corresponding to the vehicular information 80 which is normally displayed on the vehicular display part 26a and the lower image part corresponding to the mobile information 91 including the navigation information, as shown in FIG. 3B.

Figure 5A:
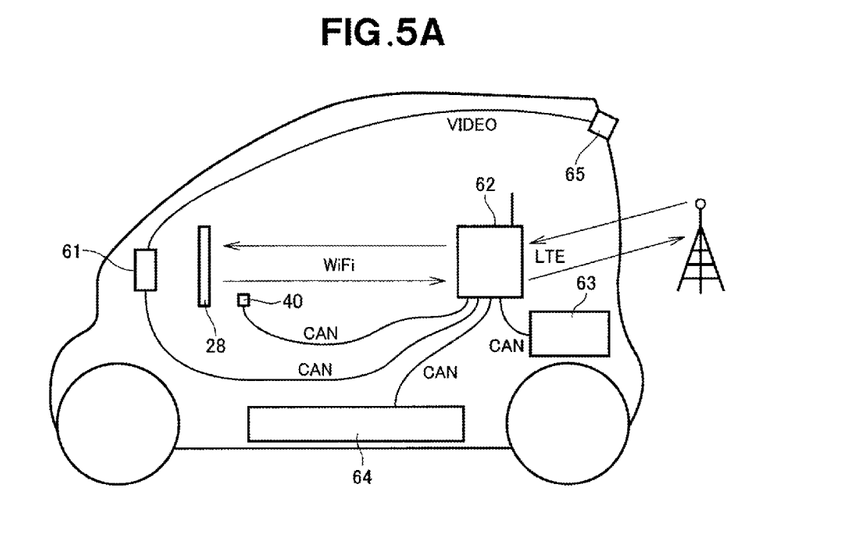
FIGS. 5A and 5B are schematic views showing configuration examples of an automotive communication network.

The following is a description of an automotive communication network of the vehicular display system 100. As shown in FIG. 5A, the vehicle on-board unit (meter unit) 26 includes a meter ECU 61. The meter ECU 61 produces a display image (display signal) of the vehicular information 80, and outputs the display image to the vehicular display part 26a, as shown in FIG. 3A. The meter ECU 61 is connected to the automotive communication network such as a CAN (controller area network). Further, the vehicle 10 includes a communication unit 62, a motor ECU 63, and a battery ECU 64, which are connected to the CAN. The operating part 40 described above is also connected to the CAN.

In FIG. 5A, the meter ECU 61 can receive information from the motor ECU 63 via the CAN, such as the vehicle speed obtained by the wheel speed sensor (not shown). The motor ECU 63 handles various items of information including the vehicle speed, a shift position, and an accelerator position, for example. The motor ECU 63 controls the power of a motor (not shown), which is a power source of the vehicle 10, and outputs the information including a current motor power, the vehicle speed, and the shift position to the meter ECU 61 in real time. Although the vehicle 10 is an electric vehicle, the vehicle 10 may be a gasoline vehicle, and the gasoline vehicle 10 may include a FI (fuel injection) ECU instead of the motor ECU 63. The FI ECU handles various items of information including the vehicle speed, the shift position, and the accelerator position, for example, controls fuel injection amount of an engine as a power source of the gasoline vehicle 10, and outputs the information including a current engine speed, the vehicle speed, and the shift position to the meter ECU 61 in real time.

The battery ECU 64 shown in FIG. 5A handles information including a residual capacity and a charged capacity of the vehicle battery (not shown). The battery ECU 64 controls charging and discharging of the vehicle battery, and outputs the above information to the meter ECU 61 in real time. The vehicle battery can be charged from an external charging stand (not shown) via a charging cable (not shown), and the vehicle 10 has a charging state indicator 164 (FIG. 1) which can be seen from outside the vehicle 10 and indicates a charging state of the vehicle battery. The battery ECU 64 controls the charging state indicator 164 as well.

The communication unit 62 includes a Wi-Fi (Wireless Fidelity) communication module (not shown) and a CAN communication module (not shown), for example, and is capable of sending to the mobile device 28 by wireless the display image (display signal) of the vehicular information 80 (FIG. 3A) via the meter ECU 61. It is preferred that the meter ECU 61 (vehicle on-board unit 26) and the mobile device 28 should be connected wirelessly in this manner, and the mobile device 28 can thereby receive the display image (display signal) of the vehicular information 80 from the meter ECU 61. Note that the mobile device 28 may receive only the vehicular information 80 from the meter ECU 61 if the mobile device 28 is configured to produce the display image (display signal) from the vehicular information 80.

By wirelessly connecting the vehicle on-board unit 26 and the mobile device 28, the mobile device 28 can readily receive the vehicular information 80 (as the raw vehicular information 80 or as the display image of the vehicular information 80) from the vehicle on-board unit 26. Conversely, if the vehicle on-board unit 26 and the mobile device 28 are connected by wire or cable, the driver 50 has to manually connect the vehicle on-board unit 26 and the mobile device 28 to set the mobile device 28 on the vehicle 10, which would be troublesome for the driver 50.

In FIG. 5A, the communication unit 62 includes an LTE (long term evolution) communication module (not shown) by which the communication unit 62 is capable of connecting to a mobile phone communication network. The communication unit 62 can access to information outside the vehicle 10, such as Internet information, via the mobile phone communication network. With this configuration, the navigation application on the mobile device 28 can receive the information outside the vehicle 10 as necessary to thereby produce or update the display image of the mobile information (navigation information) 91 as shown in FIG. 3B.

The operating part 40 and the vehicle on-board unit 26 (meter ECU 61) are connected via the CAN, as shown in FIG. 5A. The operating part 40 sends an operation signal to the vehicle on-board unit 26 via the CAN. The vehicle on-board unit 26 receives the operation signal via the CAN and sends it to the mobile device 28 via a Wi-Fi network. Since the operating part 40 and the vehicle on-board unit 26 are connected via the automotive communication network including the CAN, there is no need to provide the operating part 40 on the vehicle on-board unit 24, and the operating part 40 can be located at the position near the steering wheel 14, for example, as the predetermined position in the vehicle 10.

As described above, the automotive communication network can be composed by combining the CAN with Wi-Fi and LTE communication system. The automotive communication network may further include a video wiring between the meter ECU 61 and a rearview camera 65 to thereby allow the meter ECU 61 to receive a video signal obtained from the rearview camera 65.

Figure 5B:
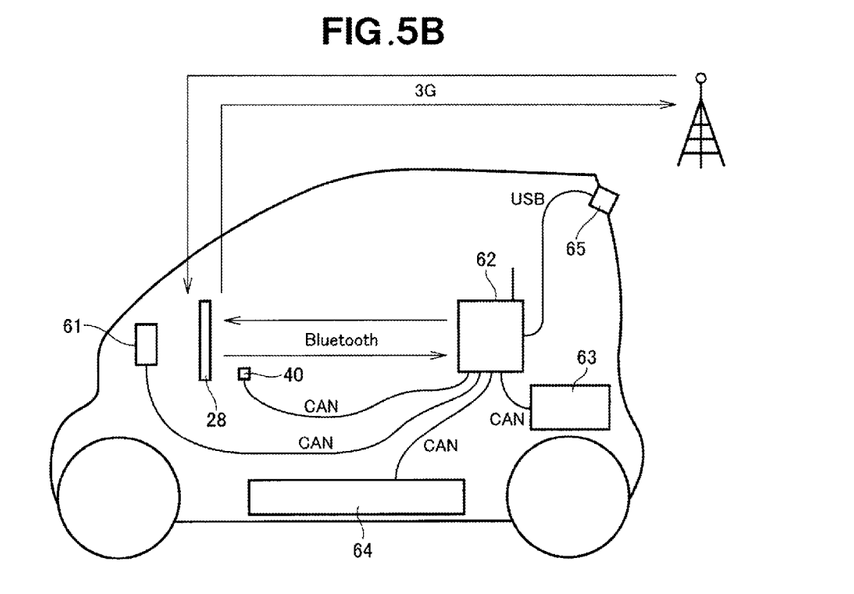

Further, the automotive communication network shown in FIG. 5A may be modified to have a configuration shown in FIG. 5B. As shown in this figure, the rearview camera 65 may be connected to the communication unit 62 via a USB (universal serial bus) cable to thereby allow the meter ECU 61 to receive the video signal obtained from the rearview camera 65 via the communication unit 62. Further, the communication unit 62 may include a Bluetooth communication module (not shown) so that the meter ECU 61 (vehicle on-board unit 26) and the mobile device 28 are connected wirelessly by Bluetooth communication ("Bluetooth" is a registered trademark for a wireless communication technology). Instead of or additionally to the above-described LTE communication module of the communication unit 62, the mobile device 28 may include therewithin a mobile phone communication module (not shown), such as a 3G communication module (not shown). In that case, for example, the navigation application on the mobile device 28 can receive via the 3G communication module the information outside the vehicle 10 as necessary.

When the driver 50 operates the operating part ("INFO" button) 40 shown in FIG. 1, the meter ECU 61 receives the operation information (operation signal) from the operating part 40. In response to the operation information, the meter ECU 61 produces the display image (display signal) of the vehicular information 80 and outputs the display image to the vehicular display part 26*a*, as shown in FIG. 3A. In this manner, normally, the display screen of the vehicular display part 26*a* is operated by means of the operating part 40. When the mobile device 28 is set in the position between the driver 50 of the vehicle 10 and the vehicular display part 26*a*, the meter ECU 61 (vehicle on-board unit 26) sends the operation information from the operating part 40 to the mobile device 28 wirelessly by Wi-Fi communication or Bluetooth communication. The mobile device 28 receives the operation information, sent from the operating part 40, and the display screen of the mobile display part 74 is operated by the operation information. Thus, by wirelessly connecting the vehicle on-board unit 26 and the mobile device 28 in this manner, the display screen of the mobile display part 74 can be operated by the operating part 40. In other words, the operating part 40 provided in the vehicle 10 can be used to operate both the vehicular display screen and the mobile display screen.

Figure 6A:
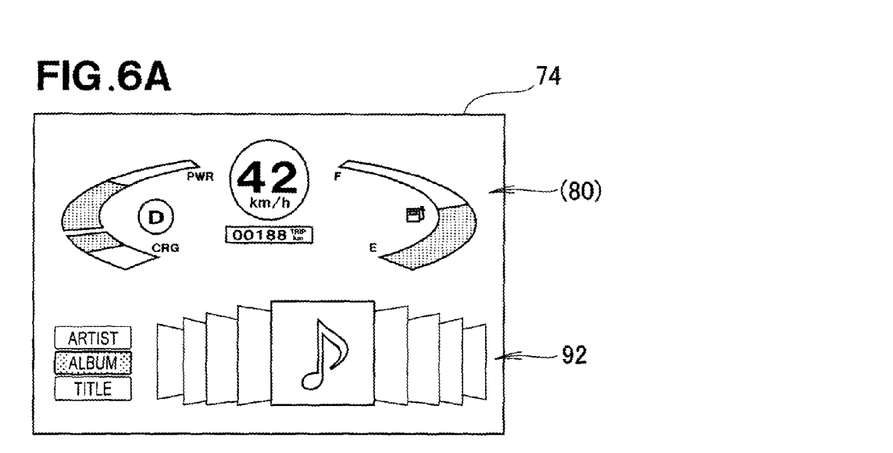
FIGS. 6A to 6C are plan views of the display screen of the mobile device displaying alternative display images.
Figure 6B:
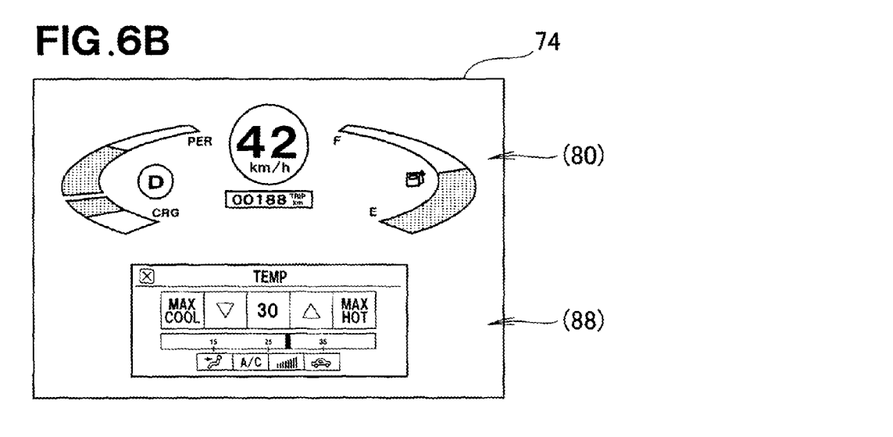
Figure 6C:
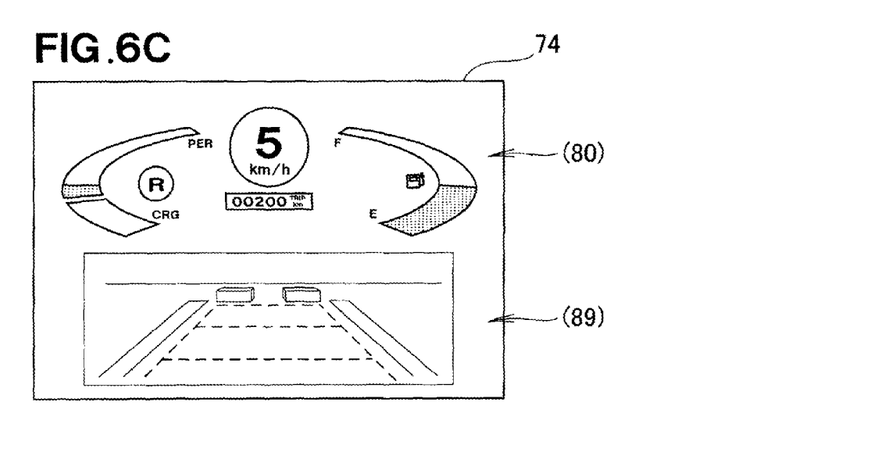

FIGS. 6A to 6C show alternative display images displayed on the mobile display part 74 of the mobile device 28. When the mobile display image displayed on the mobile display part 74 is composed of the vehicular information 80 and the mobile information (navigation information) 91 as shown in FIG. 3B, by pressing once the operating part 40, the integrated application or a music application on the mobile device 28 is caused to produce an alternative mobile information (music information) 92 to thereby obtain the mobile display image composed of the vehicular information 80 and the alternative mobile information (music information) 92, as shown in FIG. 6A. In this case, the vehicular information 80 (for example, the odometer/trip meter 84) on the mobile display screen is not necessarily changed in response to the operation of the operating part 40, and only the mobile information (navigation information) 91 is switched to the alternative mobile information (music information) 92. However, the mobile display part 74 may be configured so that the trip meter on the mobile display screen is switched to the odometer when the operating part 40 is pressed for a given time or more.

Next, when the mobile display image displayed on the mobile display part 74 is composed of the vehicular information 80 and the alternative mobile information (music information) 92 as shown in FIG. 6A, the mobile display part 74 may be configured so that, by pressing once again the operating part 40, the mobile display image is changed to be composed again of the vehicular information 80 and the mobile information (navigation information) 91 as shown in FIG. 3B, or changed to be composed of the vehicular information (first vehicular information) 80 and an alternative vehicular information (second vehicular information) 88 as shown in FIG. 6B.

Also, when the mobile display image displayed on the mobile display part 74 is composed of the vehicular information 80 and the alternative mobile information (music information) 92 as shown in FIG. 6A, the mobile display part 74 may be configured so that, by pressing the operating part ("NAVI" button) 41 shown in FIG. 1, the mobile display image is changed to be composed of the vehicular information 80 and the mobile information (navigation information) 91 as shown in FIG. 3B.

In the mobile display image of FIG. 6B, the alternative vehicular information (second vehicular information) 88 is air conditioner information, not the mobile information 91, 92 produced independently by the mobile device 28. Thus, when the mobile device 28 is not set on the vehicle 10, it is possible that the vehicular display part 26*a* of the vehicle on-board unit 26 displays the air conditioner information (second vehicular information) 88 instead of the vehicular information (first vehicular information) 80 shown in FIG. 3A.

Although in the illustrated embodiment the mobile display screen shown in FIGS. 3B, 6A and 6B is operated by means of the operating part 40 shown in FIGS. 1, 5A and 5B, the present invention is not so limited, and another operating part may be provided at a predetermined position (for example, near the steering wheel 14, on a column of the steering wheel 14, or on the rim 14*r*) in the vehicle 10 for operating the mobile display screen. Further, the operating part 40 or the other operating part is not necessarily provided as a push button type switch, and may be provided as a two-direction or four-direction key type switch which is operable in a vertical and horizontal direction, such as an operating part (door-mirror switch) 43 shown in FIG. 1. Furthermore, the operating part 40 or the other operating part is not necessarily fixedly provided to the vehicle 10, and may be provided as a remote controller including a motion sensor, for example.

The mobile display part 74 of the mobile device 28 may have a touch panel display, on which the mobile information 91 and the alternative mobile information 92 may be displayed alternately or operated in response to, for example, a flick operation or a click operation by the driver 50 or any other vehicle occupant. Further, the mobile device 28 may include an imaging unit, and may be configured so that, for example, the mobile information 91 and the alternative mobile information 92 on the mobile display part 74 are displayed alternately or operated in response to a gesture operation by the driver 50 or any other vehicle occupant imaged by the imaging unit.

As shown in FIG. 6C, the mobile display part 74 may be configured so that, when the driver 50 backs the vehicle 10, for example, during parking, the mobile display image on the mobile display part 74 is changed to be composed of the vehicular information (first vehicular information) 80 and another alternative vehicular information (third vehicular information) 89. In the mobile display image of FIG. 6C, the alternative vehicular information 89 is rearview camera information which is constituted of the video signal obtained from the rearview camera 65 and guiding lines overlapped thereon, for example. When the mobile device 28 is not set on the vehicle 10, it is also possible that the vehicular display part 26*a* of the vehicle on-board unit 26 displays the rearview camera information (third vehicular information) 89 instead of the vehicular information (first vehicular information) 80 shown in FIG. 3A.

The vehicle 10 shown in FIG. 1 includes an operating part ("SET UP" button) 42, and the driver 50 can operate the operating part 42 to perform various settings for the application on the mobile device 28. The vehicle 10 further includes other operating parts, e.g. "START" button 45, hazard button 46, D-range button 48, and N-range button 49. For example, by inserting a key (not shown) into a key cylinder 44 and operating the operating part ("START" button) 45, the power source of the vehicle 10 can be started.

The vehicular display system of the present invention is well suited for use in automotive vehicles provided with a display device for displaying information to a driver or any other vehicle occupant.

Obviously, various minor changes and modifications of the present invention are possible in light of the above teaching. It is therefore to be understood that within the scope of the appended claims the invention may be practiced otherwise than as specifically described.

What is claimed is:

1. A vehicular display system comprising:

a vehicle on-board unit having a vehicular display part; and a mobile device having a mobile display part, wherein the vehicular display part is fixedly mounted on a vehicle and configured to display vehicular information including at least a vehicle speed, wherein the mobile display part is configured to display the vehicular information when the mobile device is set in position between a driver of the vehicle and the vehicular display part, wherein the mobile display part displays the vehicular information and mobile information concurrently, the mobile information being produced independently by the mobile device, wherein the mobile display part has a display screen split into two of upper and lower regions, the upper region of the display screen displaying the vehicular information, and the lower region of the display screen displaying the mobile information, wherein the vehicle display system further includes a holder disposed between the vehicular display part and a steering wheel of the vehicle, wherein the holder has a recess receptive of a lower portion of the mobile device from above, and when the mobile device is set in the holder, the mobile device has an upper part projecting upwardly beyond an upper end of the steering wheel, and wherein when the mobile device is set in the holder, the vehicular display part is turned off.

2. The vehicular display system of claim 1, wherein the vehicle on-board unit and the mobile device are connected wirelessly, and the mobile device receives the vehicular information from the vehicle on-board unit by wireless.

3. The vehicular display system of claim 2, wherein the vehicle on-board unit sends the vehicular information to the mobile device by wireless, and the mobile device includes an application which enables the mobile device to receive the vehicular information by wireless and display the received vehicular information on the mobile display part.

4. The vehicular display system of claim 2, wherein the vehicular display part has a display screen operable by an operating part provided at a predetermined position in the vehicle, and wherein the mobile device receives by wireless from the vehicle on-board unit operation information of the operating part, and the display screen of the mobile display part being operable by the received operation information.

5. The vehicular display system of claim 4, wherein the operating part and the vehicle on-board unit are connected via an automotive communication network, and the vehicle on-board unit receives the operation information via the automotive communication network and sends the received operation information to the mobile device by wireless.

* * * * *